United States Patent
Creamer et al.

(10) Patent No.: US 8,076,403 B2
(45) Date of Patent: Dec. 13, 2011

(54) PROCESS FOR GRINDING MINERALS IN AQUEOUS DISPERSION USING A DISPERSING AGENT COMPRISING HOMOPOLYMERS AND/OR COPOLYMERS OF (METH)ACRYLIC ACID

(75) Inventors: Marianne Creamer, Warrington, PA (US); Robert Krasnansky, Le Rouret (FR); Joseph Manna, Quakertown, PA (US); Daniele Cristina Santos, Jacerei (BR)

(73) Assignee: Rohm and Haas Company, Philadelphia, PA (US)

( * ) Notice: Subject to any disclaimer, the term of this patent is extended or adjusted under 35 U.S.C. 154(b) by 108 days.

(21) Appl. No.: 12/454,790

(22) Filed: May 22, 2009

(65) Prior Publication Data

US 2009/0306266 A1   Dec. 10, 2009

Related U.S. Application Data

(63) Continuation of application No. 12/383,912, filed on Mar. 30, 2009, now abandoned.

(60) Provisional application No. 61/072,501, filed on Mar. 31, 2008.

(51) Int. Cl.
*C09B 67/22* (2006.01)
*C09B 67/04* (2006.01)

(52) U.S. Cl. ........ 524/425; 524/444; 524/447; 524/451; 524/556; 106/400; 106/436; 106/464; 106/469; 106/484

(58) Field of Classification Search .................. 524/425, 524/556, 444, 447, 451; 106/400, 436, 464, 106/469, 484
See application file for complete search history.

(56) References Cited

U.S. PATENT DOCUMENTS

| | | | |
|---|---|---|---|
| 4,046,707 A | 9/1977 | Smith et al. | |
| 4,775,420 A | 10/1988 | Gonnet et al. | |
| 4,845,191 A | 7/1989 | Hauter | |
| 4,868,228 A * | 9/1989 | Gonnet et al. | 523/333 |
| 5,077,361 A | 12/1991 | Hughes et al. | |
| 5,294,686 A | 3/1994 | Fiarman et al. | |
| 5,376,731 A | 12/1994 | Kerr et al. | |
| 6,395,813 B1 * | 5/2002 | Duccini et al. | 524/425 |

FOREIGN PATENT DOCUMENTS

| | | |
|---|---|---|
| EP | 0100947 | 10/1986 |
| EP | 0127388 | 12/1986 |
| EP | 0100948 | 4/1987 |
| EP | 0129329 | 8/1989 |
| EP | 0542644 | 10/1995 |
| EP | 0542643 | 1/1998 |
| FR | 2488814 | 2/1982 |
| FR | 2603042 | 2/1988 |

* cited by examiner

*Primary Examiner* — Michael M Bernshteyn
(74) *Attorney, Agent, or Firm* — Marcella M. Bodner

(57) ABSTRACT

The process of the present invention produces an aqueous dispersion of mineral materials, suitable for use in pigments and other coatings, by introducing a fully neutralized dispersing agent to an aqueous dispersion of coarse mineral materials, grinding the aqueous dispersion and, during grinding, adding a partially neutralized dispersing agent to the aqueous dispersion. The process of the present invention produces aqueous dispersions of very fine particles, having a solids content of at least 75% by weight, based on the total weight of the aqueous dispersion, and wherein 95% or more of the particles are below 2 microns.

6 Claims, No Drawings

PROCESS FOR GRINDING MINERALS IN AQUEOUS DISPERSION USING A DISPERSING AGENT COMPRISING HOMOPOLYMERS AND/OR COPOLYMERS OF (METH)ACRYLIC ACID

This application is a continuation of U.S. application Ser. No. 12/383,912, filed, Mar. 30, 2009, now abandoned which, in turn, claims the benefit of U.S. Provisional Application 61/072,501, filed Mar. 31, 2008.

FIELD OF THE INVENTION

The present invention relates to a process for producing aqueous dispersions of finely ground minerals suitable for use in pigments by using water soluble phosphinate terminated homopolymers and/or copolymers of acrylic acid/methacrylic acid as a dispersion aid during grinding. The present invention also relates to the dispersions produced by said process.

BACKGROUND OF THE INVENTION

The use of mineral materials for preparing industrial products for the paint industry, for coating paper, fillers for rubbers and synthetic resins etc. is well known and represented in the prior art. Such mineral materials include, for example, calcium carbonate, sulphate and silicate, as well as aluminum silicate, kaolin, talc and titanium oxides. When used as pigments, such as in paper coatings, solid particles of one or more mineral materials are suspended in water, along with binding agents, dispersing agents, thickeners, coloring agents and, possibly, other additives. Such coatings must have a low viscosity which remains stable throughout the storage, transport and coating processes to facilitate handling and application, as well as the highest possible solids (mineral) content to reduce the amount of heat and time required to dry the coating material.

It is difficult to use some mineral materials, such as the calcium compounds, as pigments because the particles do not naturally disperse, nor remain dispersed, sufficiently. Such mineral substances are typically converted to useful form by grinding into very fine aqueous dispersions in which the constituent particles are as small as possible, i.e., typically smaller than a few microns. Moreover, even when such mineral materials are initially successfully ground and dispersed in an aqueous dispersion, there is often a tendency for the mineral solids to form a gel, which increases the viscosity of the dispersion, sometimes to the point of being useless for the intended application.

To enhance dispersion and reduce gel formation in dispersions of mineral materials, one or more grinding and/or dispersing agents (hereinafter referred to collectively as "dispersing agents") are often introduced into the mineral dispersion before and/or during grinding. For example, it is well known to use water soluble acrylic polymers and/or copolymers, of low molecular weight, totally or partially neutralized by various neutralizing agents, as the dispersing agents. See, e.g., French Patent Nos. FR2488814 and FR2603042, and European Patent Nos. EP0100947, EP0127388, EP0129329, EP0542644, EP0100948 and EP0542643.

U.S. Pat. No. 4,868,228 discloses grinding agents in aqueous dispersions of mineral materials, and, in particular, the use of such grinding agents to produce low viscosity aqueous dispersions of mineral solids. The grinding agents are described to be acrylic acid polymers and/or copolymers that are completely neutralized by at least one neutralizing agent having a monovalent function and at least one neutralizing agent having a polyvalent function. This reference teaches that the only fraction of acrylic alkaline polymers and/or copolymers of which the specific viscosity lies between 0.3 and 0.8 delivers the maximum required characteristics of a grinding agent. The resulting aqueous dispersions contain at least 70% solids and at least 95% of the mineral particles have a greatest dimension less than 2 microns. French Patent No. FR2488814 discloses a process using acrylic alkaline polymers and/or copolymers for preparing an aqueous dispersion of mineral substances with a high solids concentration of very fine mineral particles of which 95% have a dimension less than 2 microns, and of which 75% at least have a dimension less than 1 micron, and also having a viscosity much lower than that previously obtained. FR2488814 also teaches that the only fraction of acrylic alkaline polymers and/or copolymers of which the specific viscosity lies between 0.3 and 0.8 delivers the maximum required characteristics of a grinding agent. However, it was also observed that the viscosity of the resulting dispersions was not, in fact, stable over time, and that eight days after grinding, the viscosity increased by two to five times the viscosity that had been measured immediately after grinding was completed. U.S. Pat. No. 6,395,813B1 discloses dispersions of solid particles in water formed by grinding using water soluble phosphonate-terminated homopolymer and/or copolymer to form dispersions of fine particles, 70% or more of which are below 2 microns, and 70% or more are below 1 micron. U.S. Pat. No. 6,395,813B1 teaches that such dispersing agents having a weight average molecular weight of from 2000 to 6000 are especially preferred.

It would be advantageous to have a grinding process which produced a mineral dispersion of low initial viscosity, high solids content and having minimal viscosity increases (i.e., minimal gel formation) over time.

SUMMARY OF THE INVENTION

The present invention provides a process for producing a dispersion of mineral materials suitable for use as pigments. The mineral(s) may be calcium carbonate, aluminum silicate, kaolin, talc, and/or titanium oxides. The process comprises the steps of: (A) preparing a mixture comprising water and a mineral be ground, comprising particles and said mixture having at least 75% solids content by weight, based on the total weight of the mixture; (B) introducing a fully neutralized dispersing agent into the mixture, in an amount of from 0.1% to 0.5% by weight, based on the dry weight of the mineral present in the mixture; (C) grinding the mixture to produce an aqueous dispersion; (D) introducing into the dispersion, during grinding, at least two portions of a partially neutralized dispersing agent, which has been at least 30% neutralized, based on equivalents of acid groups, wherein the total of the portions is from 0.2% to 1.0% by weight, based on the dry weight of the mineral present in the mixture; and (E) continuing grinding the dispersion until 95% or more of the mineral particles have a minimum dimension below 2 microns. For example, the dispersion may be ground for at least 110 minutes.

Each of the fully neutralized and partially neutralized dispersing agents is selected from one or more water soluble, phosphorus-containing polymers having the formula:

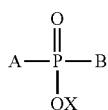

wherein A is a polymer derived from units comprising ethylenically unsaturated monomers; B is a hydrogen, phenyl, $C_1$-$C_6$ alkyl, or is a polymer consisting of ethylenically unsaturated monomers; X is hydrogen, an alkali metal, an alkaline earth metal, ammonium or an amine residue, wherein the ethylenically unsaturated monomers are selected from the group consisting of: acrylic acid, methacrylic acid, maleic acid, maleic anhydride, a sulfonic unsaturated monomer and an unsaturated polymerizable monomer having a COOH group, and wherein each of said fully neutralized and partially neutralized dispersing agents comprises: (a) from 55% to 80% by weight acrylic acid, (b) from 20% to 45% by weight methacrylic acid, and (c) from 0% to 10% by weight of at least one monomer selected from the group consisting of: maleic acid, maleic anhydride, a sulfonic unsaturated monomer and an unsaturated polymerizable monomer having a COOH group, wherein the weight percents are based on the total weight of the dispersing agent and the total of the percentages of components (a), (b) and (c) does not exceed 100. The dispersing agents have a molecular weight of from 2,000 to 10,000, based on (weight/number) average molecular weight.

In one embodiment, the at least two portions of a partially neutralized dispersing agent total from 0.2% to 0.8% by weight, based on the dry weight of the mineral present in the mixture. For example without limitation, the at least two portions may comprise a plurality of portions, a first group of which comprises two separately introduced portions which total 0.3% by weight of the partially neutralized dispersing agent and a second group of which comprises four separately introduced portions which total 0.5% by weight of partially neutralized dispersing agent, based on the dry weight of the mineral present in the mixture.

The present invention also provides a dispersion of particulate mineral solids in a medium containing water and at least one dispersing agent, wherein the dispersing agent comprises a water soluble, phosphonate terminated homopolymer of acrylic acid with a weight average weight of from 2,000 to 10,000 and wherein 95% or more of the particulate mineral solids has a particle size of less than 2 micrometers and said dispersion has a solids content of at least 75% by weight, based on the total weight of the dispersion.

DETAILED DESCRIPTION OF THE INVENTION

The process of the present invention produces an aqueous dispersion of mineral materials, suitable for use in pigments and other coatings, by introducing a fully neutralized dispersing agent to an aqueous dispersion of coarse mineral materials, grinding the aqueous dispersion and, during grinding, adding a partially neutralized dispersing agent to the aqueous dispersion. The dispersing agents are water soluble, phosphorous-containing polymers. The process of the present invention produces aqueous dispersions of very fine particles, having a solids content of at least 75% by weight, based on the total weight of the aqueous dispersion, and wherein 95% or more of the particles are below 2 microns. Such aqueous dispersions are suitable for use in the fields of coating of paper, as well as those of paint, ceramics, drilling fluids, fillers for synthetic resins and rubbers, detergent and any other field using said suspensions such as notably cements, plasters and other fields of application in the construction industry.

Whether fully or partially neutralized, the dispersing agents are water soluble, phosphorous-containing polymers having the formula:

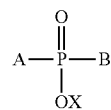

wherein A is a polymer derived from units comprising ethylenically unsaturated monomers; B is a hydrogen, phenyl, $C_1$-$C_6$ alkyl, or is a polymer consisting of ethylenically unsaturated monomers; X is hydrogen, an alkali metal, an alkaline earth metal, ammonium or an amine residue. The ethylenically unsaturated monomers are selected from the group consisting of: acrylic acid, methacrylic acid, maleic acid, maleic anhydride, a sulfonic unsaturated monomer and an unsaturated polymerizable monomer having a COOH group. Each of said fully neutralized and partially neutralized dispersing agents comprises (a) from 55% to 80% by weight acrylic acid, (b) from 20% to 45% by weight methacrylic acid, and (c) from 0% to 10% by weight of at least one monomer selected from the group consisting of: maleic acid, maleic anhydride, a sulfonic unsaturated monomer and an unsaturated polymerizable monomer having a COOH group. The weight percents are based on the total weight of the dispersing agent and the total of the percentages of components (a), (b) and (c) does not exceed 100. For example, in one embodiment, the dispersing agents may comprises (a) from 55% to 75% by weight acrylic acid, (b) from 25% to 45% by weight methacrylic acid, and (c) from 0% to 10% by weight of at least one monomer selected from the group consisting of: maleic acid, maleic anhydride, a sulfonic unsaturated monomer and an unsaturated polymerizable monomer having a COOH group.

The dispersing agents have a weight average molecular weight of from 2,000 to 10,000, such as from 3,000 to 6,000. Although stable dispersions with a low viscosity can be obtained with dispersing agents of a higher molecular weight, there is an increased tendency for gel formation with polymers of molecular weight above 6000 which may be disadvantageous in some applications.

The acrylic acid polymers and/or copolymers suitable for use as dispersing agents are produced by polymerization using known processes, in an aqueous, alcoholic, hydroalcoholic, aromatic or aliphatic medium, from acrylic acid and at least one of the following monomers and/or comonomers: methacrylic acid, itaconic acid, crotonic acid, fumaric acid, maleic acid, isocrotonic acid, aconitic acid, mesaconic acid, sinapic acid, undecylenic acid, angelic acid, hydroxyacrylic acid, and also acrolein, acrylamide, acrylonitrile, esters of acrylic and methacrylic acids and in particular dimethylaminoethyl methacrylate, the imidazoles, vinylpyrolidone, vinylcaprolactame, ethylene, propylene, isobutylene, di-isobutylene, vinyl acetate, styrene, alphamethylstyrene, and methylvinylketone. Where the dispersing agent is a co-polymer of acrylic acid, the other monomer is preferably maleic acid or maleic anhydride, methacrylic acid, or any unsaturated polymerisable monomers having a COOH group. Furthermore, the water soluble dispersing agent is preferably a phosphonate terminated co-polymer of acrylic acid and methacrylic acid. Such polymers may be made, for example, according to U.S. Pat. No. 4,046,707, U.S. Pat. No. 5,376,731, U.S. Pat. No. 5,077,361 and U.S. Pat. No. 5,294,686.

The polymerization medium may be water, methanol, ethanol, propanol, isopropanol, the butanols or dimethylformamide, dimethylsulfoxide, tetrahydrofurane, acetone, methylethylketone, ethyl acetate, butyl acetate, hexane, heptane, benzene, toluene, xylene, mercaptoethanol, tert. dodecylmercaptan, thioglycolic acid and its esters, dodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, methyl chloride, and the ethers of monopropyleneglycol and diethyleneglycol.

The neutralizing agent used to fully or partially neutralize the acrylic polymer dispersing agent may have a monovalent or bivalent function, for example, without limitation, sodium hydroxide or magnesium hydroxide, or it may be a mixture of monovalently and bivalently functional neutralizing agents.

The dispersed or suspended solid mineral material may be any particulate solid which is sufficiently chemically inert to be dispersed or suspended in an aqueous medium. The particles are generally inorganic, and substantially insoluble in water. Examples include, but are not limited to, calcium carbonate, aluminum carbonate, clays, kaolin, talc and metallic oxides.

The dispersion medium may be water, or a water-containing solution. This medium may also contain alcohols, glycols, surfactants or wetting agents.

The dispersion produced by the process of the present invention provides at least two important advantages, namely, a reduction in viscosity of the dispersion and a reduction in the tendency of the dispersion to form a gel particularly in fine particle dispersions. In addition, these benefits are obtained for systems in which the percentage by weight of the solid particles in the dispersion is high, for example greater than 70%, such as, for example, greater than 75%, and the particle size is fairly uniformly very fine, i.e., 95% or more of the particles are below 2 microns.

To achieve the aforesaid resulting product, the process of the present invention involves multiple-step additions of totally neutralized and successively partially neutralized dispersing agent polymer dosages (wherein it is at least 30% percent neutralized base on equivalents, of acid groups) to promote the reduction in the tendency of dispersion to form gel, lower initial viscosity and obtain dispersion in which the percentage by weight of solid mineral particles is at least 75%, based on the total weight of the dispersion.

There are various methods for grinding mineral material, such as, for example, calcium carbonate, disclosed in the literature. As is understood by persons of ordinary skill in the art, the grinding typically involves use of a grinding material comprising very fine particles which is introduced to the aqueous suspension containing the aqueous medium, the mineral material to be ground and the dispersing agent. For example, the grinding material may have grain size between 0.20 millimeters ("mm") and 4 mm. The grinding material is generally is generally made of materials such as silicon oxide, aluminum oxide, zirconium oxide or mixtures of these or synthetic resins of great hardness, steels, etc. However, the apparatus and particular method of physically grinding the aqueous dispersion is not limited in accordance with the process of the present invention.

The time necessary to reach satisfactory fine-ness of mineral after grinding varies according to the nature and amount of mineral to be ground, grinder material hardness and size (aluminum oxide, zirconium oxide are preferred), process of stirring used, temperature, amount of dispersing agent and their addition rate and finally the degree of neutralization during the process.

The process of the present invention, as well as the aqueous dispersion produced thereby, will be further clarified by the following information and examples.

EXAMPLES

TABLE 1

| Dispersing agent compositions used in the following examples | | | | | |
|---|---|---|---|---|---|
| Dispersing Agent | Composition (weight %)* | Chain Regulator/ Initiator used to make dispersing agent | % Solids | pH | $MW_w$ |
| Commercially Available | | | | | |
| A | 100AA | Isopropanol/Sodium initiator | 43.5 | 7.0 | 7000 |
| B | 100AA | Isopropanol/Persulfate initiator | 45.0 | 4.0 | 7000 |
| C | 100AA | Isopropanol/Persulfate initiator | 45.0 | 7.0 | 7036 |
| Homopolymers | | | | | |
| 1 | 100 AA | Sodium metabisulfite/ Sodium Persulfate | 49.22 | 3.98 | 3151 |
| 2 | 100 AA | Sodium Hypophosphite/ Sodium Persulfate | 49.93 | 4.21 | 3234 |
| 3 | 100 AA | Phosphorous Acid/ Sodium Persulfate | 47.96 | 5.62 | 3437 |
| Copolymers - | | | | | |
| 4 | AA/MAA//70/30 | Sodium Hypophosphite/ Sodium Persulfate | 47.70 | 4.26 | 3406 |
| 5 | AA/MAA//70/30 | Sodium Hypophosphite/ Sodium Persulfate | 49.82 | 4.02 | 3866 |
| 6 | AA/MAA//70/30 | Sodium Hypophosphite/ Sodium Persulfate | 47.89 | 4.3 | 4793 |
| 7 | AA/MAA//75/25 | Sodium Hypophosphite/ Sodium Persulfate | 46.93 | 4.25 | 3433 |

TABLE 1-continued

Dispersing agent compositions used in the following examples

| Dispersing Agent | Composition (weight %)* | Chain Regulator/ Initiator used to make dispersing agent | % Solids | pH | $MW_w$ |
|---|---|---|---|---|---|
| 8 | AA/MAA//75/25 | Sodium Hypophosphite/ Sodium Persulfate | 46.53 | 4.05 | 3971 |
| 9 | AA/MAA//75/25 | Sodium Hypophosphite/ Sodium Persulfate | 46.69 | 4.26 | 4789 |
| 10 | AA/MAA//65/35 | Sodium Hypophosphite/ Sodium Persulfate | 46.33 | 4.29 | 3495 |
| 11 | AA/MAA//65/35 | Sodium Hypophosphite/ Sodium Persulfate | 47.18 | 4.33 | 3879 |
| 12 | AA/MAA//65/35 | Sodium Hypophosphite/ Sodium Persulfate | 47.26 | 4.27 | 4623 |

*Abbreviations are as follows: AA = acrylic acid, and MAA = methacrylic acid.

Dispersing agents A, B and C were prepared using a method well known to those skilled in the art using a persulfate initiator and isopropyl alcohol (IPA) as the chain transfer agent. Dispersing agents 2 and from 4 to 12, inclusive, were prepared using sodium hypophosphite (NaHP) as the chain transfer agent. Dispersing agent 1 was prepared using sodium metabisulphite (SMBS) and dispersing agent 3 is phosphonate containing polymer of the present invention and was prepared using phosphorous acid ($H_3PO_3$) as the chain transfer agent.

Each of experiments in the following examples was performed, generally, in accordance with the following basic procedure:

The dispersion was prepared by first adding the amount of 0.2% of totally neutralized polymer dispersing agent to water, mineral clay and grinding media (balls) into a stainless steel double wall beaker to be ground.

The resulting aqueous solution was stirred at a rate of 1400-1600 rpm for the first 5 minutes, and then at a rate of 1400+/−10 rpm for additional 5 minutes to complete 10 minutes.

The total amount 0.8% of partially neutralized dispersing agent was divided into equal parts and added, one at a time, successively, every 5 minutes, over the remainder of grinding time, which totaled 110 minutes, or until the desirable particle size of 95% less than 2 microns was achieved.

The solids content (% by weight based on the total weight of the aqueous dispersion), particle size (in microns, or μm) and final pH and viscosity of the aqueous dispersion were measured immediately after grinding time (at $T_0$).

Lastly, gel tendency and viscosity were measured using a conventional Brookfield type viscosimeter.

The weight percents of dispersing agents reported hereinafter as having been added to the aqueous dispersions is based on the dry weight of the dispersing agent added compared to the dry weight of the mineral material in the dispersion.

Example 1

Measurement of Viscosity and Gel Tendency for Dispersions of Calcium Carbonate of Particle Size at least 95% less than 2 microns using homopolymer (100 AA) with different end-groups. Gel tendency and viscosity were measured after each of 1 hour ($T_1$), 24 hours ($T_{24}$), and 144 hours ($T_{144}$).

For each of four experiments (one each with a different dispersing agent, A+B, 1, 2 and 3), 0.2% by weight of fully neutralized dispersing agent in solution was added to the aqueous dispersion before commencement of grinding. During grinding, partially neutralized dispersing agent was added as follows: a total of 0.3% by weight added in 2 separate steps, and a total of 0.5% added in 4 separate steps. The results are provided in Table 2 below and demonstrate that phosphinate terminated homopolymer, in particular, dispersing agent 2 which is in accordance with the present invention, provides significant lower initial viscosity and lower gel tendency after 1 hour than dispersants combination A+B and phosphonate or sodium metabisulphite (SMBS) end-group polymers.

TABLE 2

| Dispersing Agent | Grinding time (min) | Part size distrib. % < 2 μm | Part size distrib. % < 1 μm | Solids (wt %) | pH | Viscosity (S4 - 100 rpm) | Gel (Spindle C) T0 | T1 | T24 | T144 |
|---|---|---|---|---|---|---|---|---|---|---|
| A + B | 121 | 97.2 | 64.1 | 76.0 | 8.5 | 794 | 12.2 | 18.2 | 43.8 | 68 |
| 1 | 128 | 97.0 | 65.5 | 71.8 | 9.1 | >2000 | — | — | — | — |
| 2 | 115 | 96.5 | 63.1 | 76.0 | 8.7 | 568 | 6.7 | 15.6 | >140 | >140 |
| 3 | 114 | 96.6 | 63.9 | 76.0 | 9.0 | >2000 | 94.3 | — | >140 | >140 |

Example 2

Measurement of Viscosity and Gel Tendency for Dispersions of Calcium Carbonate of Particle Size at least 95% less than 2 microns use phosphinate terminated copolymers at different composition ratio (AA/MAA) and molecule weight. Gel tendency and viscosity were measured after each of 1 hour ($T_1$), 24 hours ($T_{24}$), 168 hours ($T_{168}$), and 28 days ($T_{28d}$).

The 15 calcium carbonate dispersions listed below were prepared using the same grinding process described above, where 0.2% by weight of fully neutralized dispersing agent in solution, was added to the aqueous dispersion before commencement of grinding, followed by addition during the grinding time of partially neutralized dispersing agent in the following amounts: a total of 0.3% added in 4 separate steps and a total of 0.5% added in 7 separate steps. The results of these 15 experiments are reported in Table 3 below and demonstrate that the dispersing agents according to the present invention, i.e., acrylic/methacryl acid phosphinate terminated copolymers, added in accordance with the process of the present invention, produce aqueous dispersions with equal or lower increases of viscosity after 168 h than commercially known dispersing agents (i.e., combination A+B and C+B). In particular, for aqueous dispersions of mineral materials, having solids content of at least 76% solids, pH of 8.6, and at least 96% of the mineral particles being 2 microns or less, which are produced with phosphinate terminated polymers as dispersing agents, the gel tendency is lower than for dispersions of equivalent characteristics but produced using non-phosphinate terminated polymers as the dispersing agent.

TABLE 3

| $MW_w$ | Dispersing Agent | Grinding Time (min) | Particle Size % < 2 μm | Particle Size % < 1 μm | Solids (%) | pH | Brookfield Viscosity (100 rpm) $T_0$ | Brookfield Viscosity (100 rpm) $T_{168\,h}$-$T_0$ | Brookfield Viscosity (100 rpm) $T_{>28\,d}$-$T_0$ | Gel Tendency (Spindle C) $T_1$ | Gel Tendency (Spindle C) $T_{24}$ | Gel Tendency (Spindle C) $T_{168}$ |
|---|---|---|---|---|---|---|---|---|---|---|---|---|
| 3433 | 7 | 113 | 96.4 | 62.7 | 76.0 | 8.5 | 484 | 3050 | 5480 | 11.9 | 76.8 | >140 |
| 3406 | 4 | 110 | 96.0 | 61.9 | 75.9 | 8.6 | 390 | 2150 | 3060 | 8.0 | 23.4 | 137 |
|  | A + C | 113.5 | 97.1 | 64.0 | 76.0 | 8.6 | 646 | 2080 | 3220 | 13 | 33 | 78 |
| 3495 | 10 | 110 | 95.7 | 61.9 | 75.9 | 8.5 | 374 | 1930 | 3470 | 8.1 | 19.1 | 105 |
| 4793 | 6 | 116 | 97.1 | 63.1 | 76.0 | 8.5 | 530 | 1540 | 2420 | 10.9 | 22.4 | 50.3 |
| 3855 | 5 | 113 | 96.2 | 62.6 | 76.0 | 8.5 | 406 | 1490 | — | — | 16.9 | 41 |
| 3866 | 5 | 114 | 96.6 | 63.3 | 76.1 | 8.6 | 420 | 1420 | 2540 | 7.4 | 16.3 | 45.8 |
| 3879 | 11 | 112.5 | 96.9 | 63.6 | 75.9 | 8.5 | 408 | 1390 | 2080 | 7.2 | 14.4 | 43.9 |
| 4789 | 9 | 116 | 96.5 | 62.8 | 76.1 | 8.5 | 476 | 1260 | 2030 | 9.1 | 16.8 | 36.7 |
|  | A + B | 113.5 | 96.2 | 62.8 | 76.1 | 8.6 | 592 | 1210 | 1910 | 12.3 | 21 | 34 |
| 3971 | 8 | 112 | 96.0 | 61.9 | 76.0 | 8.4 | 414 | 1170 | 1860 | 6.7 | 12.0 | 37.4 |
| 3855 | 5 | 113 | 96.9 | 63.3 | 76.1 | 8.6 | 402 | 1060 | 2410 | 6.3 | 10.7 | 29.2 |
| 3866 | 5 | 110 | 96.4 | 62.0 | 76.1 | 8.7 | 372 | 1060 | 1660 | 6.1 | 9.4 | 24.5 |
| 4623 | 12 | 108 | 95.6 | 61.5 | 75.9 | 8.5 | 356 | 990 | 1760 | 6.8 | 10.6 | 23.8 |
| 3879 | 11 | 108 | 95.6 | 61.2 | 75.9 | 8.5 | 344 | 680 | 1360 | 5.4 | 8.3 | 15.7 |

It is further noted that, in general, the results are enhanced when a dispersing agent comprising a copolymer composition with at least 25% methacrylic acid (by weight based on the total weight of the polymer) and weight average molecule weight above 3500. As shown in the Examples 1 and 2, the phosphinate terminated dispersing agent, when introduced according to the process of the present invention, provides stable dispersions even after standing one week or 28 days.

It will be understood that the embodiments of the present invention described hereinabove are merely exemplary and that a person skilled in the art may make variations and modifications without departing from the spirit and scope of the invention. All such variations and modifications are intended to be included within the scope of the present invention.

What is claimed is:

1. A process for producing a dispersion of mineral materials suitable for use as pigments, comprising the steps of:
   (A) preparing a mixture comprising water and a mineral be ground, comprising particles and said mixture having at least 75% solids content by weight, based on the total weight of the mixture;
   (B) introducing a fully neutralized dispersing agent into the mixture, in an amount of from 0.1% to 0.5% by weight, based on the dry weight of the mineral present in the mixture;
   (C) grinding the mixture to produce an aqueous dispersion;
   (D) introducing into said dispersion, during grinding, at least two portions of a partially neutralized dispersing agent, which has been at least 30% neutralized, based on equivalents of acid groups, wherein the total of said portions is from 0.2% to 1.0% by weight, based on the dry weight of the mineral present in the mixture, wherein said at least two portions of said introducing step comprise a plurality of portions, a first group of which comprises two separately introduced portions which total 0.3% by weight of the partially neutralized dispersing agent and a second group of which comprises four separately introduced portions which total 0.5% by weight of partially neutralized dispersing agent, based on the dry weight of the mineral present in the mixture; and
   (E) continuing grinding said dispersion until 95% or more of the mineral particles have a minimum dimension below 2 microns.

2. The process of claim 1, wherein each of said fully neutralized and partially neutralized dispersing agents have a molecular weight of from 2,000 to 10,000, based on weight average molecular weight.

3. The process of claim 1, wherein said fully neutralized dispersing agent and partially neutralized dispersing agent each has been neutralized using a neutralizing agent selected from the group consisting of: monovalently functional, bivalently functional and mixtures thereof.

4. The process of claim 1, wherein grinding continues for at least 110 minutes, and until the desired particle size is achieved.

5. The process of claim 1, wherein said mineral comprises at least one mineral selected from the group consisting of: calcium carbonate, aluminum silicate, kaolin, talc, and titanium oxides.

6. The process of claim 1, wherein said grinding is carried out in the presence of a grinding material selected from the group consisting of silicon oxide, aluminum oxide, zirconium oxide, steels and hard synthetic resins.

* * * * *